United States Patent
Tai et al.

(10) Patent No.: US 10,690,610 B2
(45) Date of Patent: Jun. 23, 2020

(54) 3D NONCONTACT HUMIDITY SENSING TECHNOLOGIES AND METHODS OF USE THEREOF

(71) Applicant: KING ABDULLAH UNIVERSITY OF SCIENCE AND TECHNOLOGY, Thuwal (SA)

(72) Inventors: Yanlong Tai, Thuwal (SA); Gilles Lubineau, Thuwal (SA)

(73) Assignee: KING ABDULLAH UNIVERSITY OF SCIENCE AND TECHNOLOGY, Thuwal (SA)

(*) Notice: Subject to any disclaimer, the term of this patent is extended or adjusted under 35 U.S.C. 154(b) by 75 days.

(21) Appl. No.: 16/072,702

(22) PCT Filed: Mar. 2, 2017

(86) PCT No.: PCT/IB2017/051235
§ 371 (c)(1),
(2) Date: Jul. 25, 2018

(87) PCT Pub. No.: WO2017/149499
PCT Pub. Date: Sep. 8, 2017

(65) Prior Publication Data
US 2019/0360957 A1 Nov. 28, 2019

Related U.S. Application Data

(60) Provisional application No. 62/303,732, filed on Mar. 4, 2016.

(51) Int. Cl.
G01N 27/12 (2006.01)
G01N 27/14 (2006.01)
(Continued)

(52) U.S. Cl.
CPC ......... G01N 27/127 (2013.01); G01N 27/121 (2013.01); G01N 27/14 (2013.01); G01N 27/225 (2013.01); H01B 1/04 (2013.01)

(58) Field of Classification Search
CPC .... G01N 27/127; G01N 27/121; G01N 27/14; G01N 27/225; H01B 1/044
See application file for complete search history.

(56) References Cited

U.S. PATENT DOCUMENTS

| | | | | |
|---|---|---|---|---|
| 8,400,409 | B1* | 3/2013 | Francis | G06F 3/0416 324/678 |
| 2002/0046947 | A1* | 4/2002 | Lawless | G01N 27/4071 204/426 |

(Continued)

FOREIGN PATENT DOCUMENTS

| WO | 2012178071 A2 | 12/2012 |
|---|---|---|
| WO | 2015130923 A1 | 9/2015 |

OTHER PUBLICATIONS

International Search Report in related International Application No. PCT/IB2017/051235, dated May 10, 2017.

(Continued)

*Primary Examiner* — Jeff W Natalini
(74) *Attorney, Agent, or Firm* — Patent Portfolio Builders PLLC

(57) ABSTRACT

Noncontact sensing components are provided herein, in an aspect, they can be for an electronic device. The noncontact sensing components can contain a semiconductor layer having a r-GO portion and a CNT portion. The noncontact sensing components can be used to detect the presence or movement of a humidity source in the vicinity of the noncontact sensing component. The resistance/humidity response of the component can be based on the combined contribution of carbon nanotube (positive resistance varia- (Continued)

tion) and reduced-graphene oxide (negative resistance variation) behaviors.

20 Claims, 12 Drawing Sheets

(51) Int. Cl.
*G01N 27/22* (2006.01)
*H01B 1/04* (2006.01)

(56) References Cited

U.S. PATENT DOCUMENTS

| | | |
|---|---|---|
| 2013/0122533 A1* | 5/2013 | Pitchai-Mydeen ........ C08J 5/18 435/28 |
| 2014/0105242 A1* | 4/2014 | Fernandes ............... G01J 5/046 374/45 |
| 2015/0064603 A1 | 3/2015 | Smithyman et al. |
| 2015/0185918 A1 | 7/2015 | Backman et al. |
| 2015/0275016 A1 | 10/2015 | Bao et al. |
| 2015/0284253 A1* | 10/2015 | Zhamu ..................... C09K 5/14 423/448 |
| 2016/0287089 A1* | 10/2016 | Yi ......................... A61B 5/6897 |
| 2018/0136266 A1* | 5/2018 | Ho ......................... G01R 27/14 |

OTHER PUBLICATIONS

Written Opinion of the International Searching Authority in related International Application No. PCT/IB2017/051235, dated May 10, 2017.

* cited by examiner

FIG. 1A 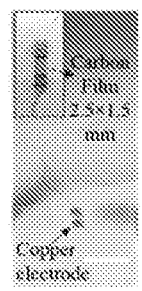 FIG. 1B 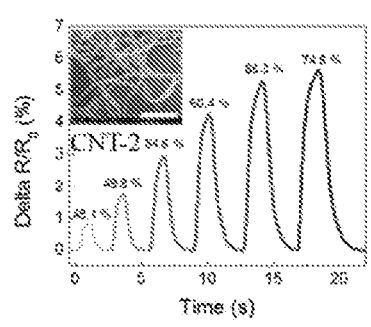 FIG. 1C 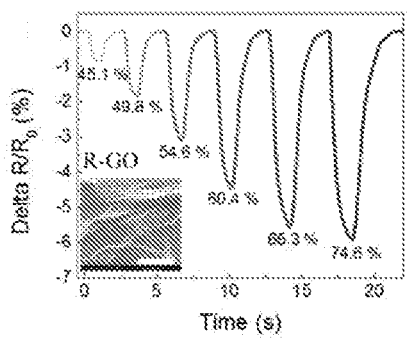
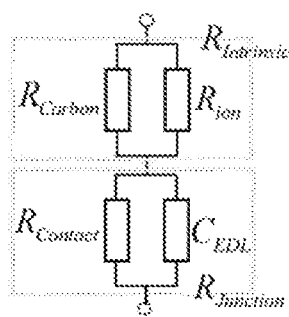 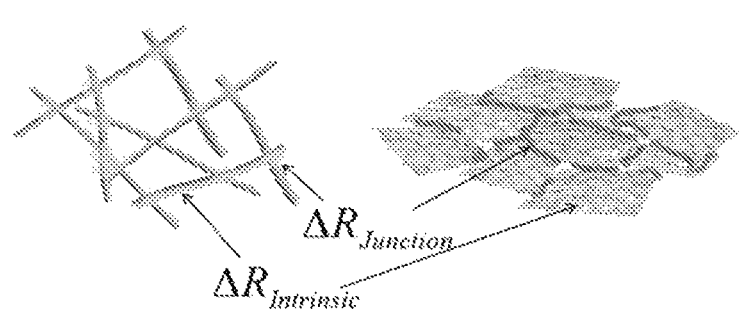
FIG. 1D  FIG. 1E FIG. 8A
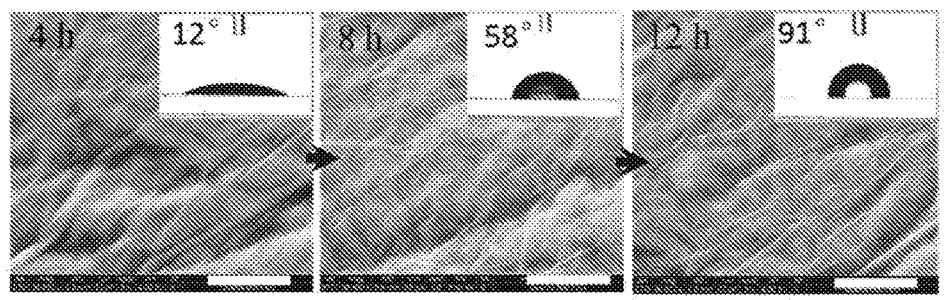
FIG. 8B
FIG. 8C
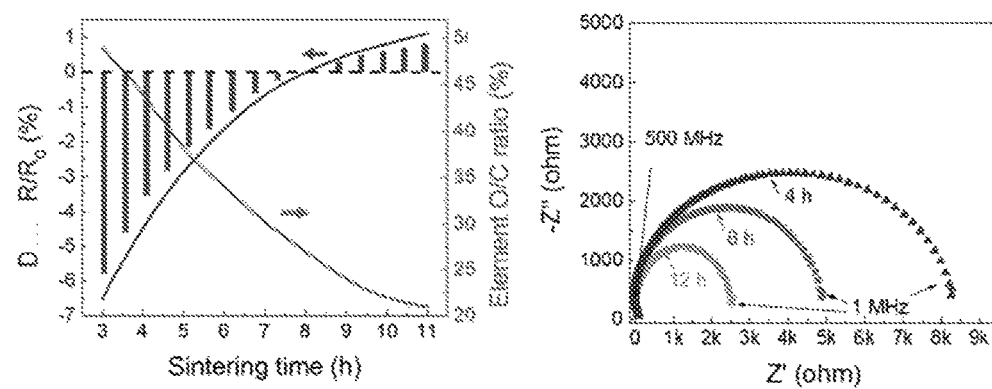

FIG. 9A
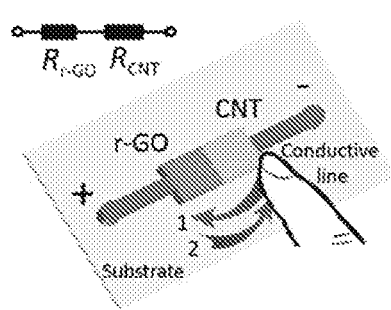
FIG. 9B
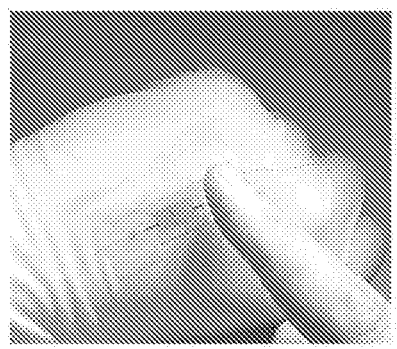
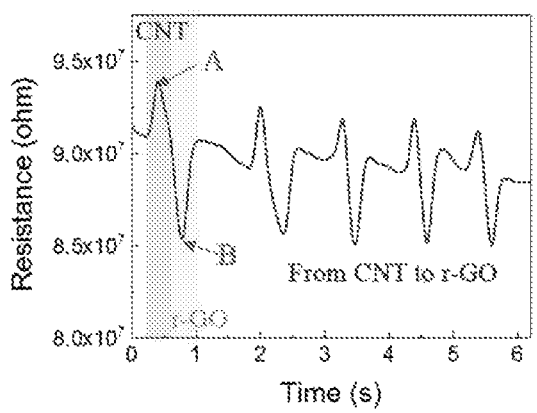
FIG. 9C
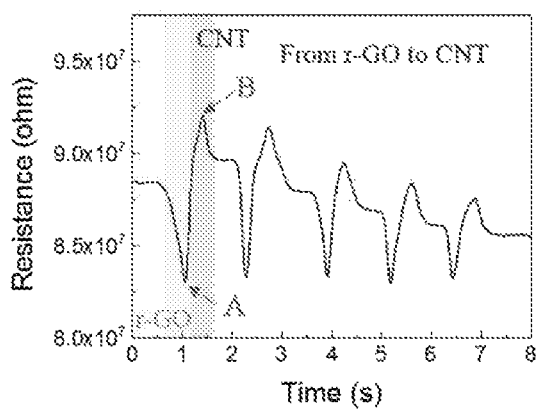
FIG. 9D

3D NONCONTACT HUMIDITY SENSING TECHNOLOGIES AND METHODS OF USE THEREOF

CROSS-REFERENCE TO RELATED APPLICATION

This application is a U.S. National Stage Application of International Application No. PCT/IB2017/051235, filed on Mar. 2, 2017, which claims the benefit of and priority to U.S. Provisional Application Ser. No. 62/303,732, having the title "3D NONCONTACT HUMIDITY SENSING TECHNOLOGIES AND METHODS OF USE THEREOF," filed on 4 Mar. 2016, the disclosures of which are incorporated herein by reference in their entirety.

TECHNICAL FIELD

The present disclosure generally relates to noncontact sensing devices for gesture recognition.

BACKGROUND

Recently, carbon-based nanomaterials, e.g., carbon nanotubes (CNTs) and reduced graphene oxide (r-GO), have been believed to be promising candidates for various flexible electronic devices like flexible transparent electrodes, electrochemical energy storage and conversion, electrical skin, and actuators. These widely practical applications are attributed to their high performance including significant flexibility with relatively high Young's modulus and good tunable metallic/semiconducting electrical properties. These carbon-based nanomaterials have demonstrated electronic properties that are highly sensitive to ambient humidity.

Their capability for humidity detection, has generated lots of interest up to now. On one hand, this is due to the fast-growing demand of industrial flexible electronics for environment humidity sensing and control. Compared with traditional humidity sensitive materials, like ceramics (e.g., $Al_2O_3$ and $TiO_2$), semiconductors (e.g., GaN, $SnO_2$, and $In_2O_3$) and polymers (e.g., polyelectrolytes and conducting polymers), carbon-based nanomaterials exhibit larger surface-volume ratio, faster response, higher reproducibility, lower cost, and suitability for large scale manufacturing.

There remains a need, however, for improved systems, and methods for using the aforementioned humidity sensitivities.

SUMMARY

Here, in various aspects, a conductive film is provided with an entirely different resistance/humidity response, which is based on the combined contribution of carbon nanotube (positive resistance variation) and reduced-graphene oxide (negative resistance variation) behaviors. The resulting mechanism is analyzed and demonstrated to be based on the effect of contact resistance ($R_{Junction}$) and intrinsic resistance ($R_{intrinsic}$) through a series of experiments, such as resistance/humidity tests of multi-wall carbon nanotube (MWCNT) with different lengths and reduced-graphene oxide (r-GO) and with different sintering times. It was found that the experimental results are very consistent with the provided theoretical mechanism. To verify the efficiency of the application to human/machine interaction, transparent flexible devices were fabricated on polyethylene terephthalate (PET) substrate with a CNT/r-GO pattern for gesture recognition, and CNT/r-GO/CNT or r-GO/CNT/r-GO patterns for 3-dimensional noncontact sensing, showing high response rates, great repeatability and stability.

In an embodiment, the present disclosure provides carbon-based semiconductor materials containing a reduced graphene oxide (r-GO) and CNT wherein the r-GO or the CNT is the semiconductor material which have a resistance/humidity variation of about −15% to 15% to human index finger. In various aspects, the different resistance/humidity responses of r-GO can be accomplished by adjusting the sintering times, the sintering temperature, as well as the pattern thickness and area. In various aspects, the r-GO has been sintered at a temperature of about 140° C. to 160° C. for a period of time of about 4 hours to 12 hours. In various aspects, the thickness of both patterns are kept about 10 nm to 200 nm to insure the high transparence of final device. The device can further contain one or more additional layers, e.g. transparent substrate layers such as polyethylene terephthalate, polycarbonate, polymethyl methacrylate, polyethylene naphthalate, polyethersulfone, polyvinyl alcohol, polyimide, polystyrene, or glass.

Methods of making the carbon-based semiconductor materials and electronic devices including a r-GO are provided. The methods can include applying an ink to a surface of a substrate, wherein the ink contains graphene oxide in a suitable solvent; drying the ink to produce a graphene oxide material or layer on the substrate; and sintering the material or layer at a temperature and for a period of time sufficient to produce a reduced graphene oxide (r-GO), wherein the material or layer has a resistance/humidity variation of about −15% to 15%.

The present disclosure provides carbon-based semiconductor materials include a variety of different CNTs. For example, in various aspects, the CNTs can have an average length of about 0.5 μm to 50 μm. The CNTs can have an average outer diameter of about 5 nm to 20 nm. The CNTs can be single-walled or multi-walled CNTs.

Electronic devices are provided containing the composite material. The composite material can have a thickness of about 10 nm to 200 nm. The composite material can have a resistance/humidity variation of about −0% to 15%. The device can further contain one or more additional layers, e.g. transparent substrate layers such as polyethylene terephthalate, polycarbonate, polymethyl methacrylate, polyethylene naphthalate, polyethersulfone, polyvinyl alcohol, polyimide, polystyrene, or glass.

Methods of making the carbon-based semiconductor materials and electronic devices including a r-GO/CNT composite are provided. The methods can include applying an ink to a surface of a substrate, wherein the ink contains graphene oxide and CNTs in a suitable solvent; drying the ink to produce a composite material or layer on the substrate; and sintering the material or layer at a temperature and for a period of time.

The present disclosure also provides noncontact sensing components. The noncontact sensing components can be used for a variety of noncontact sensing applications in mobile electronic devices such as phones or tablets. The noncontact sensing components can include a semiconductor layer having a reduced graphene oxide (r-GO) portion and a carbon nanotube (CNT) portion, wherein the resistance of the semiconductor layer changes in response to a movement of a humidity source near the semiconductor layer.

The semiconductor layer in the noncontact sensing component can have a variety of geometries. In various aspects, the semiconductor layer contains a first r-GO portion and a second r-GO portion, and the CNT portion is between the first r-GO portion and the second r-GO portion. In some aspects, the semiconductor layer contains a first CNT portion and a second CNT portion, and the r-GO portion is between the first CNT portion and the second CNT portion.

The humidity source can be a finger, thumb, or hand. The movement of the humidity source can result in a change in the resistance of the semiconductor layer. The movement can include a movement perpendicular to the semiconductor layer, a movement parallel to the semiconductor layer, or a combination thereof. The change in the resistance of the semiconductor layer can include a positive resistance variation in the CNT portion(s) and a negative resistance variation in the r-GO portion(s).

Electronic devices are provided containing one or more of the noncontact sensing components. Methods of gesture recognition in the electronic devices are also provided. The methods can include measuring a change in an electrical property such as current, resistance, or voltage, in the noncontact sensing component in response to a gesture. The gestures can include a drag, a swipe, a fling, a pinch, a spread, or a combination thereof.

Other systems, methods, features, and advantages of the humidity sensitive and nonsensitive material and methods of use will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Further aspects of the present disclosure will be readily appreciated upon review of the detailed description of its various embodiments, described below, when taken in conjunction with the accompanying drawings.

FIGS. 1A-1E depict different resistance/humidity responses of carbon-based conductive films. FIG. 1A is a picture of a measurement method to investigate the resistance/humidity response of MWCNT/r-GO based conductive films, wherein the scale bar is 1 cm. FIG. 1B is a graph of the resistance/humidity response of a MWCNT film. FIG. 1C is a graph of the resistance/humidity response of a r-GO film. The inset images in FIGS. 1B and 1C are the corresponding SEM images with a 500 nm scale bar. FIG. 1E is a microstructure model of MWCNT and r-GO based conductive films (right) and the equivalent electrical circuitry, FIG. 1D. The symbols in FIGS. 1D and 1E include $R_{intrinsic}$: the resistance of CNTs or r-GO plates without junctions; $R_{Carbon}$: the pure resistance of CNTs or r-GO plates at RH 0%; $R_{ion}$: the contribution from the environment humidity; $R_{Junction}$: the contact resistance between CNTs or r-GO plates; $R_{Contact}$: the ohmic-contact resistance between CNTs or r-GO plates; $C_{EDL}$: the contribution from the environment humidity. The default MWCNT film is based on CNT-2, and the default sintering time of r-GO film at 150° C., is 5 hours.

FIG. 2A depicts digital images with different sintering time ranging (from left to right) 0 hours, 4 hours, 8 hours, and 12 hours. FIG. 2B is a graph demonstrating the relationship between sintering time (h, along the horizontal axis) and sheet resistance (MΩ/sq, along the vertical axis). An image of the GO ink with the concentration of 0.05 mg/ml is depicted in the inset of FIG. 2B. FIG. 2C is a graph depicting the relationship between capacitance (F, along the vertical axis) and frequency (from 20 Hz to 2 MHz, along the horizontal axis) with the sample size of 1 cm×1 cm.

FIG. 3A depicts digital images with different lengths of 10 μm to 50 μm (CNT-1), 3 μm to 30 μm (CNT-2), and 0.5 μm to 2 μm (CNT-3), with the same outer diameter of 8 μm to 15 μm, and with an overall purity of 95 wt %. FIG. 3B is a graph demonstrating the relationship between the length and sheet resistance. Images of the MWCNT inks with the concentration of 0.05 mg/ml are depicted in the inset of FIG. 3B. FIG. 3C is a graph demonstrating the relationship between capacitance (F, along the vertical axis) and frequency (from 20 Hz to 2 MHz, along the horizontal axis) with the sample size of 1 cm×1 cm.

FIG. 5A is a graph of r-GO sintered at 150° C. for 5 h. FIG. 5B is a graph of CNT-2. The objective of this test is to characterize the thickness of the r-GO and MWCNT based conductive films.

FIG. 6A depicts a series of SEM images with the corresponding network models for, from left to right, CNT-1, CNT-2, and CNT-3, all the scale bars are 500 nm. FIG. 6B is a graph of the resistance/humidity response of CNT-1, CNT-2, and CNT-3. FIG. 6C is a graph of the Nyquist plots of the impedance (real part Z' versus imaginary part Z" within the frequency range from 1 MHz to 500 MHz) of MWCNT films (incl. CNT-1, CNT-2, and CNT-3). The default humidity is room relative humidity (41.3%), and the default temperature is room temperature.

FIG. 7A is an EDAX analysis of MWCNT films with different lengths (CNT-1, CNT-2, and CNT-3, respectively). FIG. 7B is an EDAX analysis of r-GO films with different sintering time (4 h, 8 h, and 12 h, respectively, at 150° C.).

FIGS. 8A-8C demonstrate the influence of $R_{intrinsic}$ of r-GO on the resistance/humidity response. FIG. 8A is a series of SEM images showing DI-water contact angle for r-GO with different sintering times (from left to right, 4 h, 8 h, 12 h, respectively at 150° C.). FIG. 8B is a graph of the resistance/humidity response (left axis) and O/C ratio (right axis) as a function of the sintering time. FIG. 8C is a graph of the Nyquist plots of the impedance (imaginary part Z" versus real part Z' within the 1 to 500 MHz frequency range), of r-GO films with different sintering times.

FIGS. 9A-9D demonstrate transparent, flexible devices for gesture recognition. FIG. 9A is a schematic illustration of the characterization method with its equivalent electrical circuitry. FIG. 9B is an image of a typical transparent flexible device attached on the hand. FIG. 9C is a graph demonstrating real-time resistance response for gesture recognition from MWCNT to r-GO. FIG. 9D is a graph demonstrating real-time resistance response for gesture recognition from r-GO to MWCNT. The sintering time of r-GO based conductive film is 5 h, and the finger-displacement speed is 1.3 s/period.

FIG. 11A is a schematic illustration of a characterization method. FIG. 11B is a digital image of a typical transparent flexible device. FIG. 11C is a graph of the real-time resistance response of down/up-period test of human index finger from 10 mm to 1 mm with the same finger-moving speed (1.3 s/period). FIG. 11D is a graph of the real-time resistance response of down/up-period test with different finger-moving speeds (speed-1: 2.7 s/period, speed-2: 2.1 s/period, and speed-3: 1.1 s/period, respectively). The sintering time of r-GO based conductive film is 5 h.

DETAILED DESCRIPTION

Figure 2A:
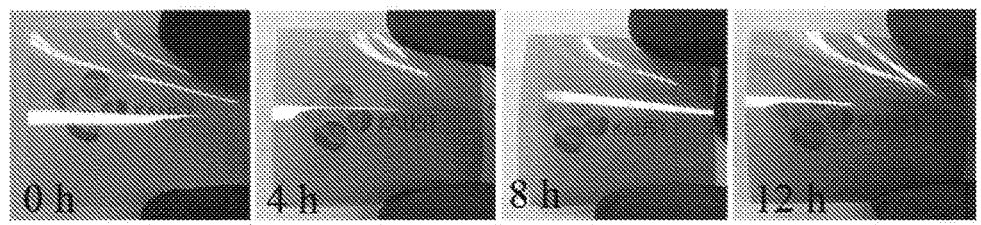
FIGS. 2A-2C depict the basic properties of r-GO based transparent conductive films on PET substrate.

Carbon-based conductive materials are provided herein exhibiting opposing resistance responses to changes in ambient humidity levels. Carbon nanotube (CNT) materials are provided demonstrating a positive resistance variation to humidity. Reduced graphene oxide (r-GO) materials are provided that demonstrate a negative resistance variation to humidity, followed by a positive resistance variation to humidity for highly sintered materials.

Noncontact sensing components are provided using the carbon nanotube materials. For example, a variety of noncontact sensing components are provided that utilize the opposing resistance responses of the carbon nanotube (CNT) materials and reduced graphene oxide (r-GO) materials to provide gesture recognition and 3D detection. Electronic devices containing the noncontact sensing components are provided, and methods of using the components and devices for noncontact sensing. Methods of making the aforementioned noncontact sensing components are also provided.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting. The skilled artisan will recognize many variants and adaptations of the embodiments described herein. These variants and adaptations are intended to be included in the teachings of this disclosure and to be encompassed by the claims herein.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

Although any methods and materials similar or equivalent to those described herein can also be used in the practice or testing of the present disclosure, the preferred methods and materials are now described. Functions or constructions well-known in the art may not be described in detail for brevity and/or clarity. Embodiments of the present disclosure will employ, unless otherwise indicated, techniques of nanotechnology, organic chemistry, material science and engineering and the like, which are within the skill of the art. Such techniques are explained fully in the literature.

It should be noted that ratios, concentrations, amounts, and other numerical data can be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to about 5%" should be interpreted to include not only the explicitly recited values of about 0.1% to about 5%, but also include individual values (e.g., 1%, 2%, 3%, and 4%) and the sub-ranges (e.g., 0.5%, 1.1%, 2.2%, 3.3%, and 4.4%) within the indicated range. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z', Likewise, the phrase 'about x, y, z, or greater' should be interpreted to include the specific ranges of 'about x', 'about y', and 'about z' as well as the ranges of 'greater than x', greater than y', and 'greater than z'. In some embodiments, the term "about" can include traditional rounding according to significant figures of the numerical value. In addition, the phrase "about 'x' to 'y'", where 'x' and 'y' are numerical values, includes "about 'x' to about 'y'".

Definitions

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

The articles "a" and "an," as used herein, mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

The term "resistance/humidity variation," as used herein, refers to the ratio $(R_1-R_0)/R_0$, where $R_0$ is the initial resistance at a first humidity and $R_1$ is the final resistance at a second humidity. The resistance/humidity variation is often provided as a percentage. The resistance/humidity variation is said to be a positive resistance/humidity variation when the resistance increases with increasing humidity, and the resistance/humidity variation is said to be negative when the resistance decreases with increasing humidity.

The term "oxygen-to-carbon ratio" or "O/C ratio," as used herein, means the molar ratio of oxygen atoms to carbon atoms in a molecule or material. The O/C ratio, when used to describe a material with a variety of oxidation states, may mean the statistical average O/C ratio for the material. The O/C ratio can be given as an absolute ratio or as a percentage, as will generally be apparent from the context. The O/C ratio can be measured from a variety of techniques capable of estimates the atomic content of a material. In some instances the O/C ratio is measured from spectroscopic methods such as energy-dispersive X-ray spectroscopy (EDS).

Noncontact Sensing Components

Noncontact sensing components are provided herein. The noncontact sensing components can contain a semiconductor layer having a r-GO portion and a CNT portion. The noncontact sensing components can be used to detect the presence or movement of a humidity source in the vicinity of the noncontact sensing component. For example, the resistance of the semiconductor layer can change in response to the presence of a humidity source or the movement of a humidity source near the semiconductor layer.

The noncontact sensing component can have a variety of configurations. For example, in some embodiments the noncontact sensing component includes a semiconductor layer having a single r-GO portion and a single CNT portion (see, e.g. FIG. 9A). In some embodiments the noncontact sensing component includes a semiconductor layer having multiple r-GO portions and/or multiple CNT portions. The noncontact sensing component can include a semiconductor layer having a first r-GO portion and a second r-GO portion with a CNT portion between the first r-GO portion and the second r-GO portion (see, e.g. FIG. 11A). In some embodiments the semiconductor layer includes a first CNT portion and a second CNT portion with the r-GO portion between the first CNT and the second CNT portion. A variety of other configurations can be envisioned based upon the working principles described herein. All such configurations are intended to be encompassed by the present description.

Because of the opposing resistance/humidity response of the CNT portion(s) and the r-GO portion(s), the noncontact sensing component can detect the presence or the movement of a humidity source near the semiconductor layer based on a change in the resistance of the semiconductor layer. The change in the resistance of the semiconductor layer can include a positive resistance variation in the CNT portion(s) and a negative resistance variation in the r-GO portion(s).

The noncontact sensing components can be used to detect the presence and/or the movement of any humidity source. For example, the humidity source can be a finger, a thumb, or a hand of a human or other animal. The movement can include a variety of movements including those perpendicular to the semiconductor layer, those parallel to the semiconductor layer, and a combination thereof.

The noncontact sensing components can be used in a variety of electronic devices and applications. The noncontact sensing components can be used for noncontact sensing in displays or mobile devices such as phones or tablets.

The semiconductor layer can be made with a variety of thicknesses as needed. In some embodiments the resistance/humidity variation can depend upon the thickness of the semiconductor layer. The semiconductor layer can be thin, e.g. having a thickness of about 10 nm to 100 nm, 10 nm to 75 nm, 10 nm to 50 nm, or about 25 nm. The semiconductor layer can be thick, e.g. having a thickness of about 200 nm or more, about 100 nm to 500 nm, or about 200 nm to 400 nm. In some embodiments the semiconductor layer can have a thickness of about 25 nm to 150 nm, about 50 nm to 100 nm, about 60 nm to 80 nm, or about 70 nm. In one or more aspects, the thickness is measured in a direction perpendicular to the substrate.

Methods of Making Noncontact Sensing Components

Methods of making the noncontact sensing components are provided. The methods can include making inks described herein containing graphene oxide or CNTs. The methods can include applying the inks to a substrate to form the patterned semiconductor layers on the substrate. The methods can include applying the inks to the surface of a substrate. The substrate can be a transparent substrate such as polyethylene terephthalate, polycarbonate, polymethyl methacrylate, polyethylene naphthalate, polyethersulfone, polyvinyl alcohol, polyimide, polystyrene, or glass. The substrate can be a flexible substrate.

The methods can include making an ink containing a graphene oxide material. The ink can include a solution or dispersion of the graphene oxide in water or a suitable organic solvent. The ink can include other stabilizers such as surfactants or acids. The graphene oxide can be present in the ink at any suitable concentration. For example, the graphene oxide can be present at a concentration of about 0.01 mg/ml to 1 mg/ml, about 0.01 mg/ml to 0.25 mg/ml, about 0.05 mg/ml to 0.5 mg/ml, about 0.05 mg/ml to 0.25 mg/nil, or about 0.1 mg/ml.

The methods can include making an ink containing the CNTs. The ink can include a solution or dispersion of the CNTs in water or a suitable organic solvent. The ink can include an aqueous dispersion of poly(3,4-ethylenedioxythiophene) polystyrene sulfonate (PEDOT/PSS) or other conductive polymer, or a combination thereof. The CNT can be present in the ink at any suitable concentration. In some embodiments the CNT is present at a concentration of about 0.01 mg/ml to 1 mg/ml, 0.01 mg/ml to 0.025 mg/nil, about 0.05 mg/ml to 0.5 mg/ml, about 0.05 mg/ml to 0.25 mg/ml, or about 0.1 mg/ml.

The methods can include drying the ink to produce a layer on the substrate containing the r-GO portion(s) and the CNT portion(s). The layer can be patterned on the substrate using a variety of patterning techniques. The layer can be thin, e.g. having a thickness of about 10 nm to 100 nm, 10 nm to 75 nm, 10 nm to 50 nm, or about 25 nm. The layer can be thick, e.g. having a thickness of about 200 nm or more, about 100 nm to 500 nm, or about 200 nm to 400 nm. In some embodiments the layer can have a thickness of about 25 nm to 150 nm, about 50 nm to 100 nm, about 60 nm to 80 nm, or about 70 nm. In one or more aspects, the thickness is measured in a direction perpendicular to the substrate.

The methods can include sintering the layer. The sintering time can depend upon the temperature used. In various aspects the sintering time can be about 1 hours to 9 hours, about 2 hours to 8 hours, about 3 hours to 7 hours, about 4 to 6 hours, or about 5 hours. In various aspects the sintering temperature is about 120° C. to 200° C., about 130° C. to 180° C., about 140° C. to 160° C., or about 150° C.

Methods of Using Noncontact Sensing Components

Methods of using the noncontact sensing components are also provided. The methods can include methods of gesture recognition in an electronic device containing one or more of the noncontact sensing components. The noncontact sensing components can be used individually or in combination to recognize a variety of gestures without contacting the electronic device or the sensing component.

The methods can include making a gesture with a humidity source a distance from the noncontact sensing component. The humidity source can be a finger, a thumb, or a hand of a human or other animal. The gesture can include a variety of gestures such as a drag, a swipe, a fling, a pinch, a spread, and a combination thereof. The gesture can include a movement of the humidity source including those perpendicular to the noncontact sensing component, those parallel to the noncontact sensing component, and a combination thereof. The gesture can be a single finger gesture or a double finger gesture.

The methods can include measuring a change in an electrical property of the sensing component in response to the gesture. For example, the methods can include measuring a change in the current, a change in the resistance, or a change in the voltage of the noncontact sensing component. The methods can further include determining the gesture from the change in the electrical property.

Examples

Now having described the embodiments of the present disclosure, in general, the following Examples describe some additional embodiments of the present disclosure. While embodiments of the present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure.

Materials

Figure 2B:
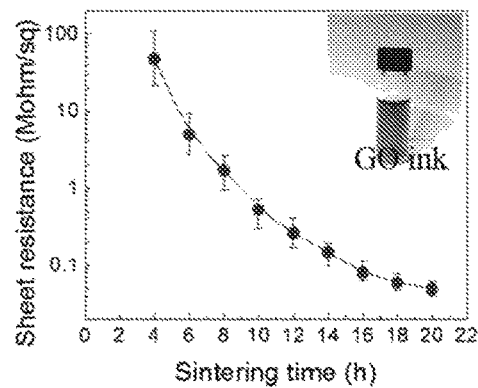
Figure 2C:
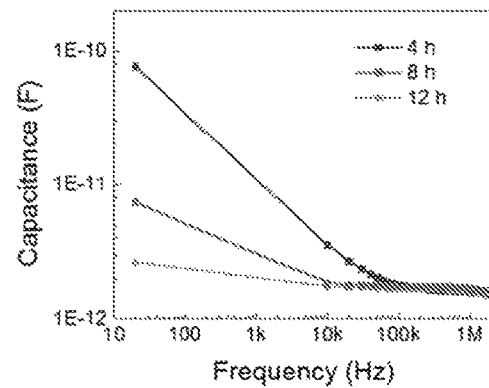

Carboxyl group (—COOH) functionalized multi-wall carbon nanotube (MWCNT) with different lengths were purchased from Cheap Tubes, Inc., incl. CNT-1: length=10-50 μm, CNT-2: length=3-30 μm, CNT-3: length=0.5-2 μm, with the same outer diameter=8-15 nm and over 95 wt. purity. Graphite oxide ink (0.1 mg/ml) was self-synthesized and prepared in the lab from purified natural graphite (SP-1, Bay Carbon) by the Hummers method (Hummers, W. S. & Offeman, R. E., *J. Am. Chem. Soc.* 80, 1339 (1958)), as shown in FIGS. 2A-2C. Poly(3,4-ethylenedioxythiophene) polystyrene sulfonate (PEDOT/PSS) aqueous dispersion (1.3 wt. %, Clevios™ PH1000) was purchased from HC Starck, Inc. Polyethylene terephthalate (PET) films were purchased from Teonex® Inc. with the thickness of 125 μm. Deionized water was used in all experimental processes.

Fabrication of MWCNT/r-GO Based Conductive Patterns

Figure 3A:
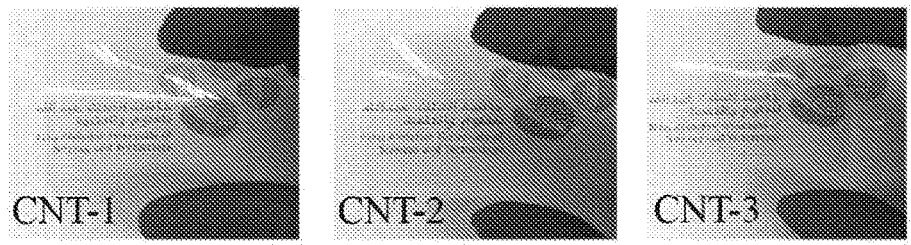
FIGS. 3A-3C depict the basic properties of MWCNT based transparent conductive films on PET substrate.
Figure 3B:
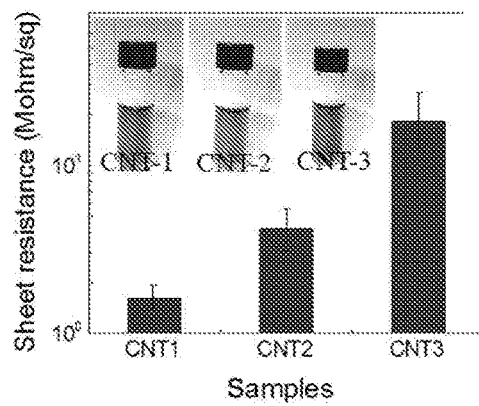

MWCNT Inks:

MWCNT (0.2 g, CNT-1), PH1000 with 5 wt. % (PEDOT-PSS to SWCNT), and DI water were combined in a glass bottle. The solid content (10 mg/ml) of SWCNT was confirmed for the prepared suspensions. Next, the mixture was homogenized using a Brason 8510 bath sonicator (Thomas Scientific) for 1 h, followed by the exfoliation of the SWCNTs through an ultrasonic processor (Cole-Parmer) at 20 kHz and 500 W for 40 min in an ice bath to prevent extensive heating and damage to the SWCNTs and PEDOT-PSS. Inks with the desired concentrations (0.1 mg/ml) were obtained by diluting the above mother inks with DI water. A similar process was used to prepare CNT-2 and CNT-3 inks. Typical inks are shown in FIG. 3B.

MWCNT/GO Inks:

The prepared MWCNT ink (0.1 mg/ml, CNT-2) was added into GO ink (0.1 mg/ml, 5 ml) with different volumes (0, 1, 2, 3, 4 and 5 ml). This preparation was homogenized using a Brason 8510 bath sonicator (Thomas Scientific) for 0.5 h. Inks with different mass ratios (MWCNT to GO, 0, 0.2, 0.4, 0.6, 0.8, 1.0) were prepared.

Carbon-Based Conductive Pattern:

Carbon-based conductive films were prepared through the drop casting approach on a PET substrate. Specifically, PET films were treated with oxygen plasma at 100 W for 60 s to generate substrate with better hydrophilicity. Next, we created a frame by sticking Teflon film tape in which rectangle holes of specific sizes were made, on the substrate. The as-prepared inks (incl. MWCNT ink, GO ink, or MWCNT/GO mixing inks) were dropped into the holes using a Thermo Scientific Finnpipette (0.2-2 μl) with a controlled concentration of 1 μl/cm$^2$. Before the Teflon frame was peeled off, these inks were baked on a hotplate at 100° C. for 30 minutes. The whole process was performed gently to achieve a homogeneous film.

R-GO based conductive patterns with different conductivities were obtained by adjusting the sintering time from 0 to 24 hours at 150° C. on a hotplate. The default sintering time is 5 hours. CNT-2/r-GO patterns with different mass ratios can be obtained by controlling the sintering time for 5 hours at 150° C. on a hotplate for the humidity sensing test. Typical MWCNT, r-GO, and MWCNT/r-GO based conductive films are shown in FIGS. 2A and 3A.

Characterization and Measurements

The prepared carbon-based patterns were examined by scanning electron microscopy (SEM, Quanta 600, FEI Company) for surface morphology analysis. This was done using a surface profilometer (Veeco Dektak 150) operating at a scanning speed of 0.167 μm/s. Energy-dispersive X-ray spectroscopy (EDS) was performed for surface element analysis using an EDAX EDS detector operating at 20 kV. Static contact angle measurements (VCA Video Contact Angle System, AST Products, Billerica, Mass.) of DI water were performed using the sessile drop method for surface wettability evaluation. An LCR meter (E4982A, Agilent Technologies) was used with frequencies ranging from 1 MHz to 3 GHz for Nyquist plots of the impedance (real part Z' versus imaginary part Z" within the frequency range of 1 to 500 MHz). A semiconductor characterization system (4200-SCS, Keithley company) was also used as well as a Cascade Microtech (Summit-11600 AP) microprobe station for resistance/humidity stability evaluation via I-V curves. A multimeter (Agilent 34401A) allowing data recording on a PC was used for mapping the real-time resistance/humidity response.

Figure 4:
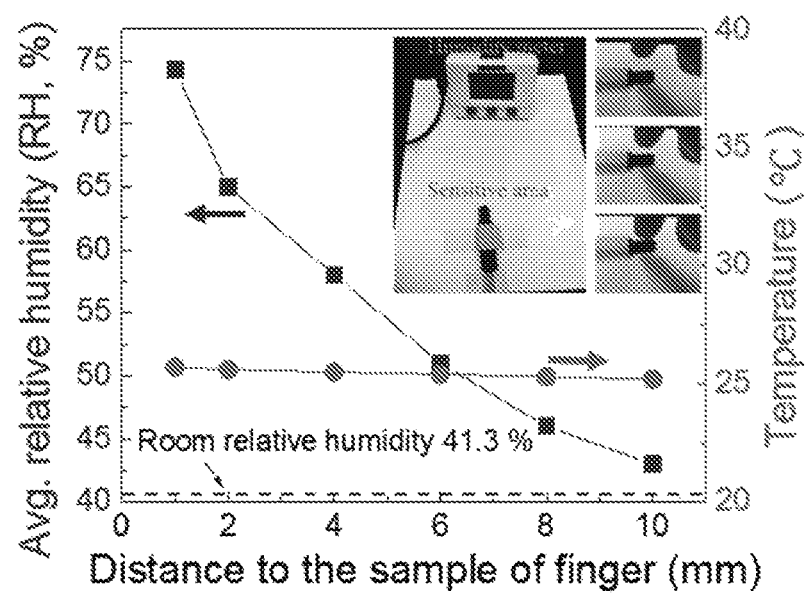
FIG. 4 is a graph of the relationship between relative humidity and distance of the sample to a human index finger calibrated by an RH reference sensor (TM325, Dickson).

It should be noted that a human index finger was used as the humidity source. To ensure precise environmental conditions, humidity and temperature around the finger were thoroughly calibrated using a humidity meter (TM325, Dickson), as shown in FIG. 4. Different humidity environments were defined according to the distance (using a ruler) between the index finger and the sample. This method is very effective to verify the efficiency of these devices intuitively in practical applications to human/machine interaction. The default room relative humidity (RH) and temperature were 41.3% and 25.2° C., respectively. Note that the finger-displacement speed was obtained from plots of resistance variation vs. time.

Results and Analysis

Difference in Resistance Responses

Figure 5A:
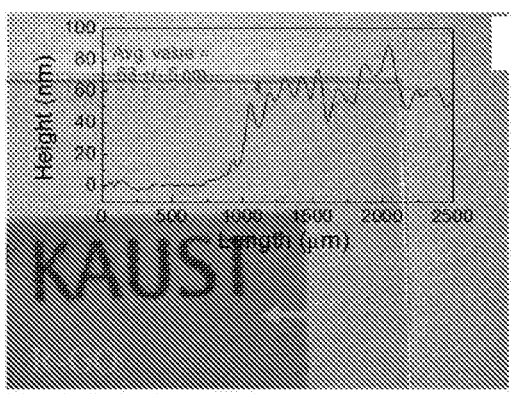
FIGS. 5A-5B depict surface profiles of the prepared carbon based transparent conductive film on PET substrate.
Figure 5B:
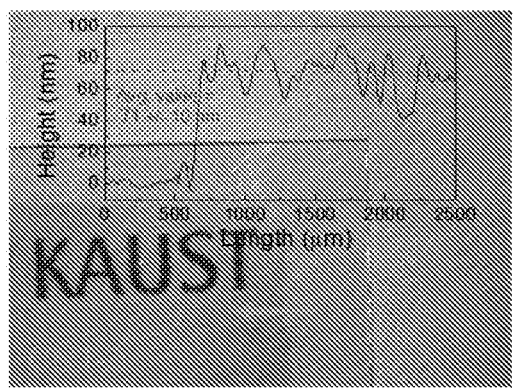

To precisely present the difference of resistance response to humidity of MWCNT and r-GO, conductive patterns (1.5×2.5 mm) made with films of same thicknesses were fabricated on PET substrates with corresponding inks and similar concentrations. This resulted in pattern thicknesses of 71±10 nm for MWCNT, 63±6 nm for r-GO, as shown in FIGS. 5A-5B. The influence of this thickness is not insignificant. Controlled humidity was provided in the vicinity of the conductive film by approaching the human index finger at various measured distances, as shown in FIG. 1A.

The resistance/humidity response of CNT-2 films can be seen in FIG. 1B. Results show that, with a decreasing distance between the finger and the conductive film, the total resistance variation (Delta $R/R_0=(R_1-R_0)/R_0$, where $R_0$ and $R_1$ are the original and updated resistance, respectively) increased gradually. This variation can be as high as 5.9% positively when the distance is 1 mm while exhibiting a humidity sensitivity of 0.197 $RH^{-1}$ (Sensitivity=$\delta(\Delta R/R_0)/\delta RH$). A similar phenomenon also took place on r-GO films in FIG. 1C whereas when the distance is 1 mm, the resistance variation is as low as 6.2% negatively while exhibiting a humidity sensitivity of 0.21 $RH^{-1}$.

SEM observations of the film microstructure (shown in the inset images of FIGS. 1B and 1C) reveal that the total resistance is composed of the intrinsic resistance of CNT or r-GO ($R_{intrinsic}$) and the contact resistance resulting at the junctions ($R_{Junction}$) among CNTs in one case and r-GO plates in the other case. This can be represented with the electrical circuit schematic shown in FIG. 1D and expressed with the following equation, Eq. 1.

$$\Sigma \Delta R = \Delta R_{Intrinsic} + \Delta R_{Junction} \qquad (1)$$

It has been reported that when the environment humidity increases, the hydrophilic functional groups (e.g., epoxy, hydroxyl and carboxyl) on the surface of CNTs and r-GOs generated during the production process can absorb water molecules with high efficiency through physical diffusion or hydrogen bonding. Then, these absorbed water molecules produce hydronium ions ($H_3O^+$) that become charged carriers through the ionized process when an electrostatic field is applied to the carbon nanomaterials, which conductivity eventually increases. Hence, both CNT and r-GO should present an n-type semiconductor behavior. However, this prediction is not consistent with the experiment results shown in FIGS. 1B and 1C.

This contradiction is explained by the fact that the junctions also absorb water molecules, resulting in a change of contact from the ohmic type to ohmic/capacitance type (electrical double layer, $C_{EDL}$). This contact modification leads to the increase of contact resistance. Hence, it can be deduced that, regarding CNT film, the resistance/humidity response of junctions among CNTs plays a more important role than that of the intrinsic resistance of CNT ($|\Delta R_{intrinsic}|<|\Delta R_{Junction}|$). This explains the positive resistance/humidity response of the CNT film.

As regards the r-GO film, the resistance response to humidity is more influenced by that of the intrinsic resistance of r-GO than that generated at the junctions among r-GO plates ($|\Delta R_{intrinsic}|>|\Delta R_{Junction}|$). This explains the negative resistance/humidity response of the r-GO film. See, e.g., FIG. 1E.

Mechanistic Analysis

To validate our model (eq. 1) and estimate the contribution of each resistive component of the related equation, a sensitivity study of different parameters was performed. The general strategy was to consider only one parameter while the other was kept constant.

Contribution of $R_{Junction}$ in the Resistance/Humidity Response

Figure 3C:
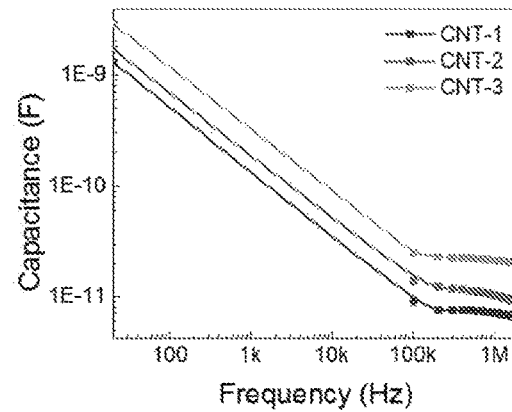
Figure 6A:
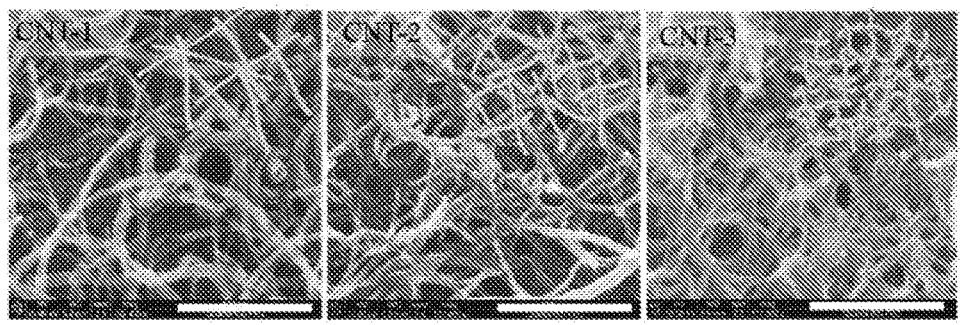
FIGS. 6A-6C demonstrate the influence of $R_{Junction}$ on the resistance/humidity response.
Figure 7A:
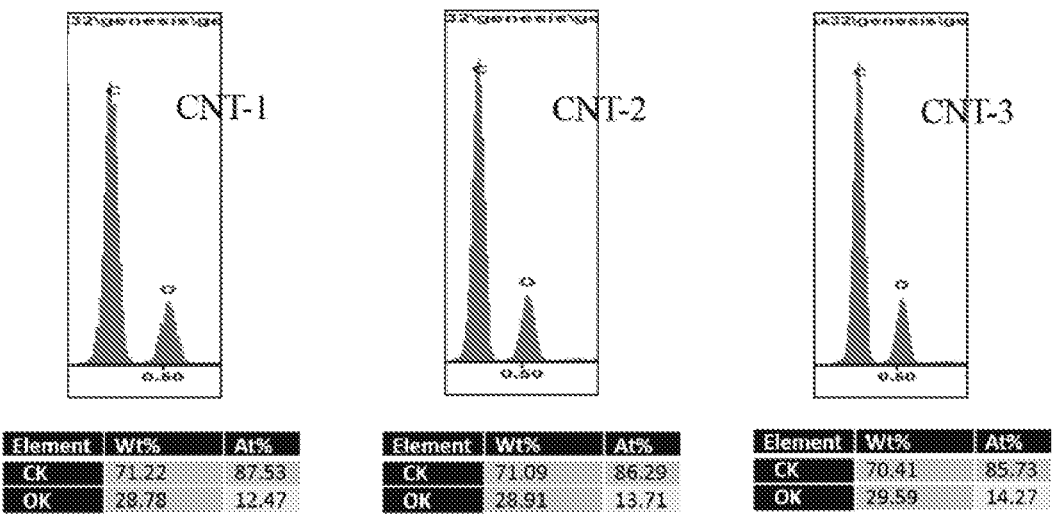
FIGS. 7A-7B depict the EDAX analysis (element ratio of carbon and oxygen) of the samples.

First, MWCNT with different lengths, L1, L2 and L3, and L1>L2>L3, were used to fabricate CNT-1, CNT-2, and CNT-3 conductive films, respectively, as shown in FIGS. 3A-3C. As these MWCNTs have the same surface properties (—COOH) and the same carbon/oxygen ratio (70.41-71.22 wt. % in FIG. 7A), the intrinsic resistance ($R_{intrinsic}$) of these conductive films are assumed to be identical. However, when sheet resistances are measured, a difference from 1.8 Mohm in CNT-1 to 18 Mohm in CNT-3) is observed (FIGS. 3A-3C). This is attributed to the greater quantity of junctions generated by shorter CNTs and considering similar film thicknesses. This can be confirmed from the observation of the microstructure in the SEM images, FIG. 6A, and the related relevant schematic network.

Figure 6B:
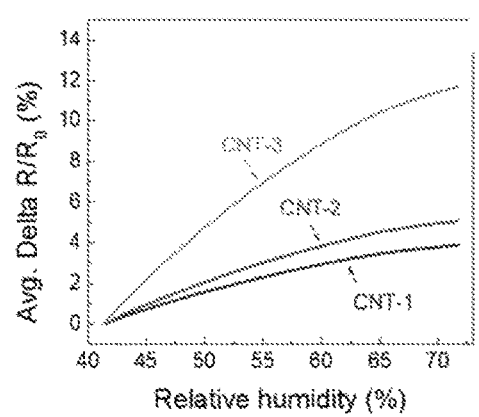

Second, the resistance of these conductive films was measured for different levels of humidity, as shown in FIG. 6B. Results demonstrated that the resistance variation augmented proportionally with increasing environment humidity. In specific, when the humidity changes from 43% (Room RH=41.3%) to 74.2%, the total resistance variation is 3.6% (CNT-1), 5.1% (CNT-2), and 11.4% (CNT-3), respectively. The influence of junctions is assumed to be very strong. This is because the contact type of these junctions changes from ohmic to ohmic/capacitance contact, leading to the increase of contact resistance that is due to the generated $C_{EDL}$. In addition, it can be seen that the sensitivity to humidity decreased gradually. This is because the absorption of water molecules is made via hydrogen bonding at the beginning, then via a physical diffusion mechanism during which the ionization effect is less significant.

Figure 6C:
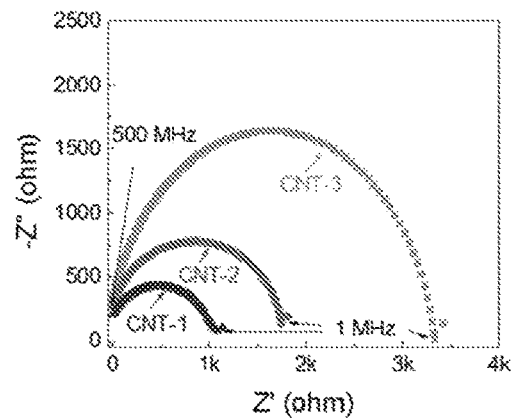

Third, the behavior of the junctions among MWCNTs was investigated through Nyquist plots. Results, summarized in FIG. 6C, show that the values of both the imaginary part Z" and the real part Z' increase from CNT-1 to CNT-3 at each frequency within the 1 to 500 MHz frequency range. The gradual increase of the imaginary part Z" indicates the existence of $C_{EDL}$ and the proportional relationship to the junction amounts. In addition, similar results are obtained when relating capacitance to frequency (FIG. 3C).

Contribution of Intrinsic Resistance in the Resistance/Humidity Response

First, r-GO based conductive films manufactured with different thermal reducing times were investigated. According to previous reports, the number of hydrophilic functional groups (e.g., epoxy, hydroxyl, and carboxyl) existing on the surface of r-GO plates, will gradually reduce during the sintering process, reducing at the same time the number of defects and finally increasing conductivity of the films (FIG. 4). For our samples, almost no difference was observed by SEM (FIG. 3A), but these changes were confirmed by DI-water contact angle measurements, as shown in the inset of FIG. 8A. The contact angle was 12° for a sintering time of 4 h, 57° for a sintering time of 8 h, and 98° for a sintering time of 12° h. Moreover, sheet resistance also improved from 52 Mohm (4 h) to 2.1 Mohm (8 h) and to 0.285 Mohm (12 h) (FIG. 2B). Hence, these r-GO films composed of stacked r-GO layers have the same junction amounts but different intrinsic resistances. Relevant digital images can be seen in FIG. 2A.

Figure 7B:
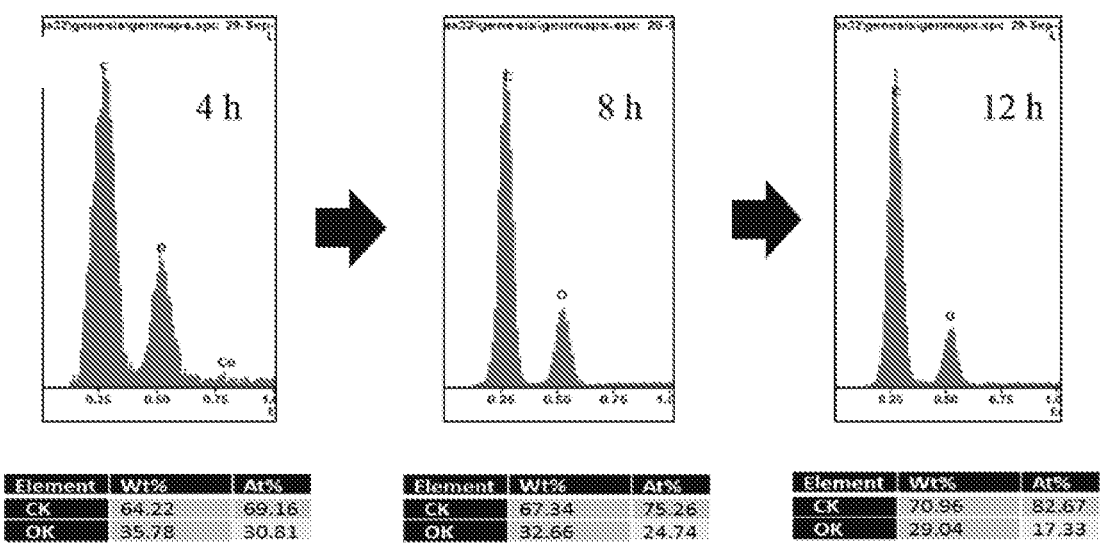

Second, resistance for different sintering durations was investigated according to humidity. Experimental results, summarized in FIG. 8B, exhibited that with the increased sintering time, the negative resistance variation reduced gradually. This is attributed to the reduction of the hydrophilic functional groups, confirmed by the O/C ratio variation in FIG. 8B and FIG. 7B. Hence, the resistance contribution of $R_{intrinsic}$ reduced regularly compared to that of $R_{Junction}$. A very interesting phenomenon was observed as the negative resistance variation reversed to positive after a sintering time of 8 hours at 150° C. This indicated that in this resistance system, $R_{intrinsic}$ has a smaller resistance contribution than $R_{Junction}$.

Third, the role of $R_{intrinsic}$ was characterized through Nyquist plots, as shown in FIG. 8C. Results exhibited that with the increasing sintering time, both real part Z' and imaginary part Z" changed a lot, indicating a strong influence of $R_{intrinsic}$. Moreover, the large value of the imaginary part Z" reveals the existence of $C_{EDL}$ in the junctions. A similar phenomenon can be deduced from the relationship between capacitance and frequency (FIG. 2C).

It can be concluded that with the MWCNT based conductive film, $R_{Junction}$ plays a crucial role on its resistance/humidity response whereas with r-GO based conductive film, $R_{intrinsic}$ plays the leading role. However this phenomenon will reverse to $R_{junction}$ when the sintering time reaches a certain value. Overall, the experimental results present a good concordance with our simple model.

Applications to Gesture Recognition

To further discuss this phenomenon of opposite humidity responses of r-GO and MWCNT, two films 8 mm long and 4 mm wide (½ length for MWCNT, ½ length for r-GO) were fabricated together on PET substrate. The goal is to reveal its application to gesture recognition, as shown in FIG. 9A. A typical transparent flexible device was presented in FIG. 9B.

Figure 10:
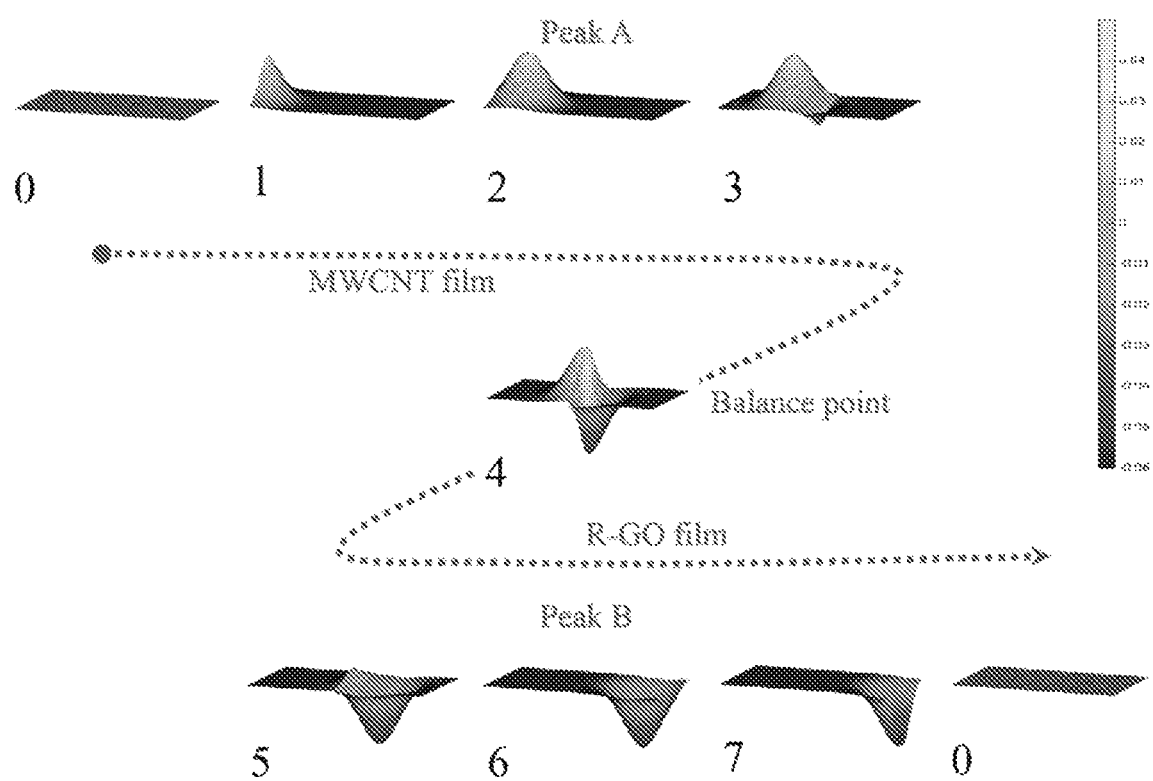
FIG. 10 depicts a mechanism analysis of an application to gesture recognition via finite element method with the pattern of MWCNT/r-GO.

Its efficiency was confirmed, as shown in FIGS. 9C and 9D. In specific, when the human index finger moved from MWCNT to r-GO, a relevant electronic signal was generated with positive resistance variation first (defined as peak-A), then negative resistance variation (defined as peak-B), and vice versa. These variations were further described through the finite element method, as shown in FIG. 10. It seems that the final total resistance variation is the combined result of the resistance/humidity responses of r-GO and MWCNT films.

Furthermore, from the real-time resistance-variation profile, it can be seen that every response period is less than 1 s, revealing its fast response rate. This rate is completely acceptable in practical applications.

In addition, it must be noted that it is very important to balance the initial resistance of WMCNT and r-GO via thickness control of the relevant conductive film, so that a clearer signal can be observed.

Therefore, this kind of transparent flexible device can recognize human gesture successfully via a non-contacting mode. This is a promising application for human/machine interaction as a wearable device.

Applications to 3-Dimensional Non-Contact Sensing

According to the gesture recognition application, it was observed that the generated positive peak of CNT and negative peak of r-GO could easily be distinguished by examining the transparent flexible pattern of CNT/r-GO.

For this application, a transparent flexible provided with an 8 mm long and 4 mm wide pattern of r-GO/CNT/r-GO was fabricated on PET substrate in such a way that the central zone (⅓ of the total area) of this pattern is covered with CNTs and the external zone a covered with r-GOs). The objective is to analyze the application of this system to 3-dimensional noncontact sensing (FIGS. 11A and 11B).

Figure 11A:
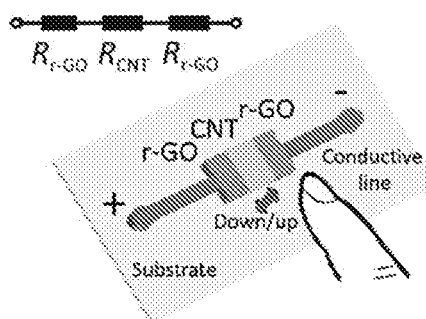
FIGS. 11A-11D demonstrate a transparent, flexible device for 3-dimensional noncontact sensing.
Figure 11B:
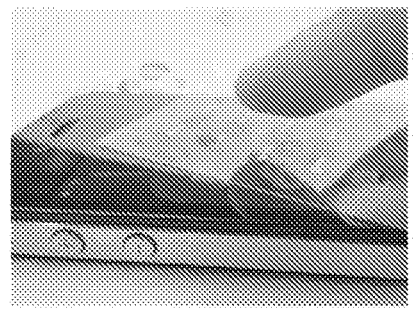
Figure 12:
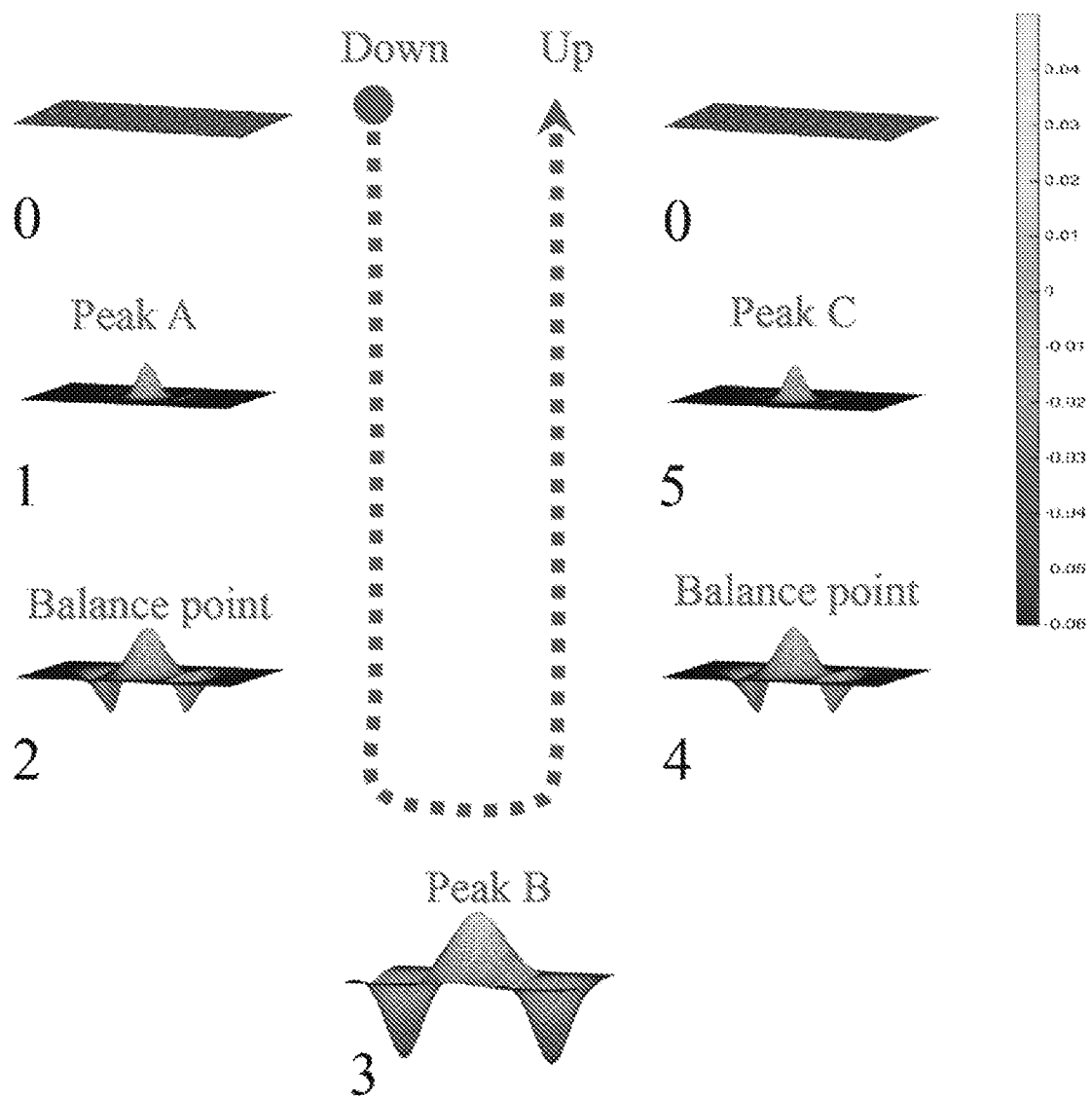
FIG. 12 depicts a mechanism analysis of an application to 3-dimensional noncontact sensing via finite element method with the pattern of r-GO/MWCNT/r-GO.

The working mechanism is shown in FIG. 11A. When the human index finger approaches these connected r-GO/CNT/r-GO films, the CNT film will sense this behavior before the r-GO films will. As the fingertip has a spherical shape, humidity is not distributed uniformly over the 3 conductive films and thus, if the finger is approached to the center of the system a positive resistance variation will be generated, defined as peak-A. When the resistance-variation, which is attributed to r-GOs is equal to that of CNTs, the resistance curve starts to lower, until it reaches the negative zone, defined as peak-B. When the finger is slowly removed, the resistance change increases immediately, until it reaches the positive zone again, defined as peak-C. Therefore, every cycle of finger displacement (moving down and up) will exhibit three peaks (two positive and one negative), corresponding to three signals. These variations were simulated using the finite element method, as shown in FIG. 12.

Figure 11C:
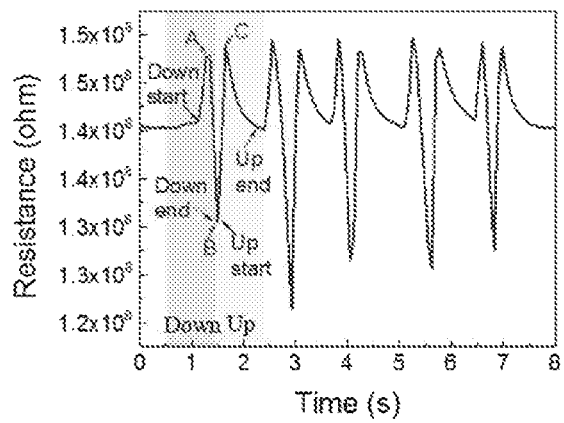

Experimental results are summarized in FIG. 11C. They reveal that the profile is very regular from one cycle to another, showing similar positive/negative peak values, and that the response time of each period is almost the same i.e. 1.3 s. This last observation demonstrates great repeatability and stability. For a single period profile, three peaks (two positive peaks and one negative peak) are clearly presented. These phenomena are very consistent with the working mechanism analysis described above.

Figure 11D:
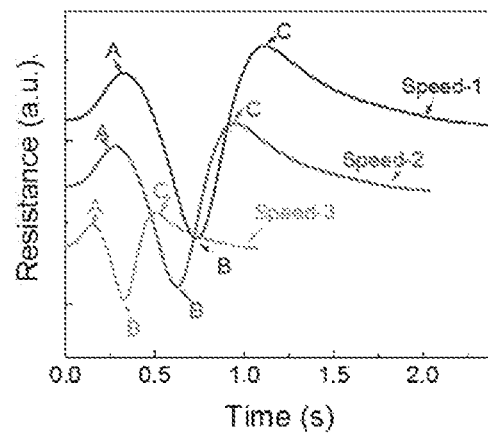

The influence of the finger-displacement speed on the generated profile was investigated (FIG. 11D). Results show that when the displacement speed increases from a 2.7 s/period to a 2.1 s/period and then to a 1.1 s/period, a clear gradual decrease of the peak intensities appears. Indeed, as the finger-displacement speed increases the films have less time to absorb water molecules, resulting in a smaller resistance variation. However, the peak profile is still very clear when the displacement speed is 1.1 s/period, showing a high response rate. This performance is still acceptable for the application to human/machine interaction. To summarize, when a human finger is quickly approached and moved away from this kind of transparent flexible device, three distinct peaks are generated successively, indicating a promising application of 3-dimensional noncontact sensing.

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of his disclosure.

We claim:

1. A noncontact sensing component for an electronic device, the noncontact sensing component comprising:
    a semiconductor layer having a reduced graphene oxide (r-GO) portion and a carbon nanotube (CNT) portion; and
    a conductive line connected only to the r-GO portion or only to the CNT portion,
    wherein the r-GO portion is separated by a junction from the CNT portion, and
    wherein a resistance of the semiconductor layer is configured to change in response to a movement of a humidity source near the semiconductor layer relative to the noncontact sensing component.

2. The noncontact sensing component of claim 1, wherein r-GO portion includes a first r-GO portion and a second r-GO portion, and
    the CNT portion is between the first r-GO portion and the second r-GO portion.

3. The noncontact sensing component of claim 1, wherein the semiconductor layer comprises a first CNT portion and a second CNT portion, and
    the r-GO portion is between the first CNT portion and the second CNT portion.

4. The noncontact sensing component of claim 1, wherein the movement of the humidity source results in a first change in the resistance of the semiconductor layer and an opposite movement of the humidity source results in a second change in the resistance of the semiconductor layer, and the first change is different from the second change.

5. The noncontact sensing component of claim 1, wherein the humidity source is a part of human anatomy.

6. The noncontact sensing component of claim 1, wherein the change in the resistance of the semiconductor layer includes a positive resistance variation in the CNT portion and a negative resistance variation in the r-GO portion.

7. The noncontact sensing component of claim 1, further comprising:
a substrate on which the semiconductor layer is arranged.

8. The noncontact sensing component of claim 7, wherein the substrate is transparent.

9. The noncontact sensing component of claim 1, wherein the CNT portion includes multi-wall carbon nanotubes.

10. The noncontact sensing component of claim 1, wherein the noncontact sensing component is a display.

11. A method of making a noncontact sensing component, the method comprising:
applying a first ink to a first portion of a surface of a substrate, wherein the first ink comprises graphene oxide in a solvent,
applying a second ink to a second portion of the surface of the substrate, wherein the second ink comprises carbon nanotubes in a solvent, and
drying the inks to produce a semiconductor layer having a reduced graphene oxide (r-GO) portion and a carbon nanotube (CNT) portion,
wherein the r-GO portion is separated by a junction from the CNT portion,
wherein a conductive line is connected only to the r-GO portion or only to the CNT portion, and
wherein a resistance of the semiconductor layer changes in response to a movement of a humidity source near the semiconductor layer relative to the noncontact sensing component.

12. The method of claim 11, further comprising:
sintering the semiconductor layer.

13. The method of claim 12, further comprising:
determining a resistance variation of the semiconductor layer; and
adjusting one of an amount of time of the sintering of the semiconductor layer, a temperature of the sintering of the semiconductor layer, a thickness of the semiconductor layer, and an area occupied by the semiconductor layer responsive to the determined resistance variation of the semiconductor layer.

14. A method, comprising:
detecting a change in an electrical property of a noncontact sensor, wherein the noncontact sensor includes a substrate carrying a semiconductor layer having a reduced graphene oxide (r-GO) portion and a carbon nanotube (CNT) portion; and
determining a gesture based on the change in the electrical property of the noncontact sensor,
wherein a conductive line is connected only to the r-GO portion or only to the CNT portion, and the r-GO portion is separated by a junction from the CNT portion.

15. The method of claim 14, wherein the electrical property is one of current, resistance, and voltage.

16. The method of claim 14, wherein the gesture is one of a drag, a swipe, a fling, a pinch, and a spread.

17. The method of claim 14, wherein
the r-GO portion includes a first r-GO portion and a second r-GO portion,
the CNT portion is between the first r-GO portion and the second r-GO portion, and
the gesture is a three-dimensional gesture.

18. The method of claim 14, wherein the electrical property is resistance, and a change in the resistance of the semiconductor layer includes a positive resistance variation in the CNT portion and a negative resistance variation in the r-GO portion.

19. The method of claim 14, wherein the electrical property is resistance and corresponds to a change in humidity.

20. The method of claim 19, wherein the r-GO portion and the CNT portion have opposing responses to changes in humidity.

* * * * *